United States Patent
Carr et al.

(10) Patent No.: US 10,424,925 B2
(45) Date of Patent: Sep. 24, 2019

(54) OPTIMIZATION OF NANOGRID CONTROLS AND OPERATION

(71) Applicant: ABB Schweiz AG, Baden (CH)

(72) Inventors: Joseph A. Carr, Raleigh, NC (US); Alexander Brissette, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 22 days.

(21) Appl. No.: 15/826,929

(22) Filed: Nov. 30, 2017

(65) Prior Publication Data

US 2019/0165577 A1 May 30, 2019

(51) Int. Cl.
| | |
|---|---|
| *H02J 3/14* | (2006.01) |
| *H02J 13/00* | (2006.01) |
| *G05B 13/02* | (2006.01) |
| *H02J 3/00* | (2006.01) |
| *H02J 3/38* | (2006.01) |

(52) U.S. Cl.
CPC .............. *H02J 3/14* (2013.01); *G05B 13/024* (2013.01); *H02J 13/0017* (2013.01); *H02J 3/381* (2013.01); *H02J 2003/007* (2013.01)

(58) Field of Classification Search
CPC .......... H02J 3/14; H02J 13/0017; H02J 3/381; H02J 2003/007; G05B 13/024
See application file for complete search history.

(56) References Cited

U.S. PATENT DOCUMENTS

| | | | |
|---|---|---|---|
| 8,823,411 B2 | 9/2014 | League | |
| 9,819,190 B2* | 11/2017 | Somani | ................... H02J 3/381 |
| 2010/0314942 A1* | 12/2010 | Talkin | ................... G06Q 50/06 |
| | | | 307/41 |

(Continued)

OTHER PUBLICATIONS

1. P. Huang, J. Kalagnanam, R. Natarajan, D. Hammerstrom, R. Melton, M. Sharma, R. Ambrosio, "Analytics and Transactive Control Design for the Pacific Northwest Smart Grid Demonstration Project," Oct. 4, 2010, in IEEE International Conference on Smart Grid Communications, Gaithersburg, MD, 2010, pp. 449-454.

(Continued)

*Primary Examiner* — Thomas C Lee
*Assistant Examiner* — Anzuman Sharmin
(74) *Attorney, Agent, or Firm* — Taft Stettinius & Hollister LLP; J. Bruce Schelkopf

(57) ABSTRACT

One exemplary embodiment is a system including nanogrid controller configured to receive power bids each including a power magnitude value and a bid value from a plurality of resource controllers, evaluate the power bids to determine resource control commands for respective resource controllers and a power bid feedback value, and transmit the resource control commands and a power bid feedback value to the plurality of resource controllers. The plurality of resource controllers are configured to generate and transmit the power bids to the nanogrid controller, receive the resource control command and in response thereto at least one of shed or restore one or more of the power loads and control a supply power from one or more of the power sources, and receive the power bid feedback value and in response thereto generate an updated power bid and transmit the updated power bid to the nanogrid controller.

26 Claims, 4 Drawing Sheets

(56) References Cited

U.S. PATENT DOCUMENTS

| | | | |
|---|---|---|---|
| 2013/0073104 A1* | 3/2013 | Sciacchitano | H02J 3/28 700/295 |
| 2014/0172503 A1 | 6/2014 | Hammerstrom et al. | |
| 2015/0280436 A1* | 10/2015 | Weckx | G06Q 50/06 700/295 |
| 2015/0379542 A1 | 12/2015 | Lian et al. | |
| 2016/0092986 A1* | 3/2016 | Lian | G06Q 30/08 700/295 |

OTHER PUBLICATIONS

2. A. Ipakchi, "Demand Side and Distributed Resource Management—A Transactive Solution," Jul. 24, 2011, in Power and Energy Society General Meeting, San Diego, CA, 2011, pp. 1-8.

3. J.C. Fuller, K.P. Schneider, D. Chassin, "Analysis of Residential Demand Response and Double-Auction Markets," Jul. 24, 2011, in Power and Energy Society General Meeting, San Diego, CA, 2011, pp. 1-7.

4. D. Jin, X. Zhang, S. Ghosh, "Simulation Models for Evaluation of Network Design and Hierarchical Transactive Control Mechanisms in Smart Grids," Apr. 3, 2012, in IEEE PES Innovative Smart Grid Technologies, Washington, D.C., 2012, pp. 1-8.

7. T. Hwang, I. Lee, "Design of a Building Energy Management System for Transactive Energy," Aug. 6, 2015, in IEEE International Symposium on Consumer Electronics, Madrid, Spain, 2015, pp. 1-2.

8. H. Hao; C. D. Corbin; K. Kalsi; R. G. Pratt, "Transactive Control of Commercial Buildings for Demand Response," Apr. 27, 2016, in IEEE Transactions on Power Systems, vol. PP, Issue: 99, Apr. 27, 2016, pp. 774-783.

\* cited by examiner

300

| Nanogrid Loads | | | | Nanogrid Sources | | |
|---|---|---|---|---|---|---|
| Load | Energy Value | Bid Value | | Source | Energy Value | Bid Value |
| HVAC | 6 kWh | $0.20/kWh | | PV Energy | 1.7 kWh | $0.04/kWh |
| Computer Equipment | 3 kWh | $0.70/kWh | | Energy Storage Discharge | 2 kWh | $0.15/kWh |
| Lighting | 1 kWh | $0.20/kWh | | Dim Lights | 0.3 kWh | $0.18/kWh |
| Refrigerator | 1 kWh | $0.15/kWh | | Start Generator | 8 kWh | $0.20/kWh |
| Energy Storage Charge | 2 kWh | $0.05/kWh | | Grid Power | Unlimited | $0.12/kWh |

| Resource | Energy Value | Bid Value | Control Command | Request Feedback |
|---|---|---|---|---|
| PV System | 0.00 kWh | -- | Off | RV 8 = 100%<br>RV 7 = 50%<br>RV 6 = 0%<br>TAP = 0.75 kWh |
| Storage Battery | 0.75 kWh | supply @ 3 | Discharge @ 100 % | |
| HVAC Zone A | 0.50 kWh | request @ 8 | On @100% | |
| HVAC Zone B | 0.50 kWh | request @ 7 | On @50% | |
| HVAC Zone C | 0.50 kWh | request @ 6 | Off | |

| Resource | Energy Value | Bid Value | Control Command | Request Feedback |
|---|---|---|---|---|
| PV System | 1.00 kWh | supply @ 3 | Supply 100% | RV 8 = 50%<br>RV 7 = 0%<br>TAP= 0.1 kWh |
| Storage Battery | 0.25 kWh | request @ 2 | Off | |
| HVAC Zone A | 0.50 kWh | request @ 8 | On @100% | |
| HVAC Zone B | 0.50 kWh | request @ 8 | On @100% | |
| HVAC Zone C | 0.50 kWh | request @ 7 | Off | |

Fig. 4B

OPTIMIZATION OF NANOGRID CONTROLS AND OPERATION

BACKGROUND

The present application relates generally to optimization of nanogrid controls and nanogrid operation. Nanogrids are electrical power networks, typically for buildings or other localized physical facilities, which include multiple resources comprising one or more electrical loads and one or more electrical sources, such as generation or storage systems, and in which the multiple resources are all controllable by a common control system, typically due to common ownership or management of the resources. Current proposals for optimization of nanogrid operation and nanogrid controls control suffer from a number of drawbacks and disadvantages. Existing proposals for nanogrid optimization have imposed prioritization, allocation and operational commands dictated by a nanogrid system controller without allowing for dynamic participation of nanogrid resources in the optimization process or providing any feedback from a nanogrid system controller to nanogrid resources or from nanogrid resources to the nanogrid system controller. There remains a significant need for the unique apparatuses, systems and methods disclosed herein.

Disclosure of Illustrative Embodiments

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a system including nanogrid controller configured to receive power bids each including a power magnitude value and a bid value from a plurality of resource controllers, evaluate the power bids to determine resource control commands for respective resource controllers and a power bid feedback value, and transmit the resource control commands and a power bid feedback value to the plurality of resource controllers. The plurality of resource controllers are configured to generate and transmit the power bids to the nanogrid controller, receive the resource control command and in response thereto at least one of shed or restore one or more of the power loads and control a supply power from one or more of the power sources, and receive the power bid feedback value and in response thereto generate an updated power bid and transmit the updated power bid to the nanogrid controller. Further embodiments, forms, objects, features, advantages, aspects, and benefits shall become apparent from the following description and drawings.

BRIEF DESCRIPTION OF THE DRAWINGS

FIG. 3 is a is a table illustrating certain parameters of an exemplary nanogrid control system.

FIGS. 4A and 4B are tables illustrating certain parameters of first and second operating states of an exemplary nanogrid control system.

DETAILED DESCRIPTION OF ILLUSTRATIVE EMBODIMENTS

Figure 1:
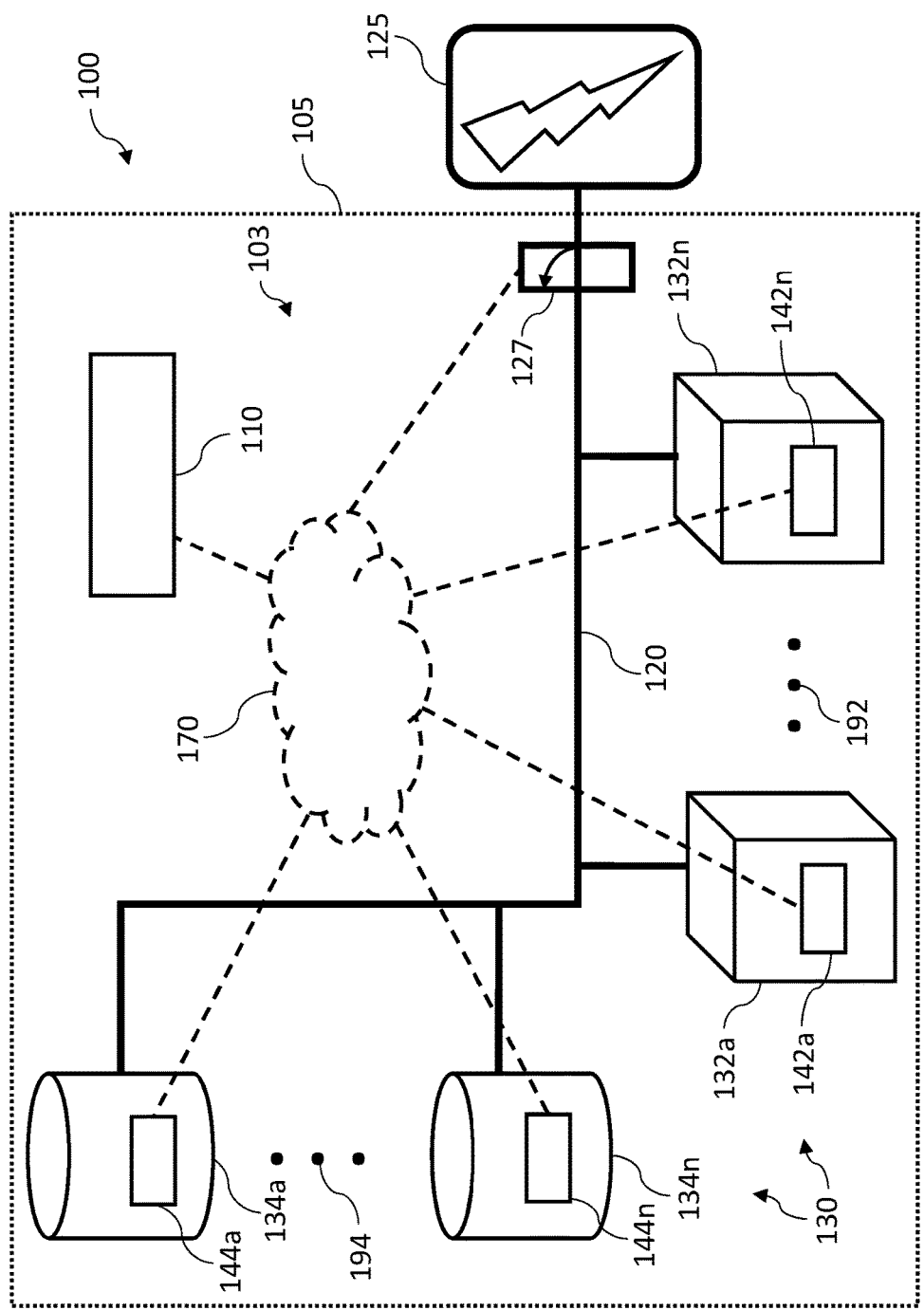
FIG. 1 is a schematic diagram illustrating certain aspects of an exemplary nanogrid system.

With reference to FIG. 1, there is illustrated a schematic diagram depicting certain aspects of an exemplary nanogrid system 100. Nanogrid system 100 includes a nanogrid 120 which is operatively coupled to an electrical power grid 125 via an electronically controllable switching device 127. Electrical power grid 125 may comprise a utility power grid, a microgrid or another type of electrical power grid. Electronically controllable switching device 127 may be a switchgear device, a controllable circuit breaker, another type of device controllable to selectably electrically couple and decouple nanogrid 120 and electrical power grid 125.

Nanogrid 120 is configured to distribute electrical power within a building 105 and is electrically coupled with a plurality of resources 130 associated with building 105. In the illustrated embodiment, resources 130 comprise a plurality of electrical loads including electrical loads 132a, 132n and electrical sources 134a, 134n. Electrical loads 132a, 132n may comprise a variety of types of electrical loads such as appliances, HVAC systems, lighting systems, refrigeration systems, water heaters and other electrical loads. In some embodiments additional electrical loads may also be provided among resources 130 as indicated by ellipsis 192.

Electrical sources 134a, 134n may comprise electrical power generation sources (e.g., engine driven generators, photo-voltaic solar power (PV) systems, wind power systems, fuel cell systems or other systems operable to generate electrical power), power storage systems (e.g., batteries, capacitor banks, pumped hydroelectric systems, flywheel systems or other systems operable to store energy) or combinations including both electrical power generation sources and power storage systems. In some embodiments additional electrical sources may also be provided among resources 130 as indicated by ellipsis 194. In other embodiments resources 130 may include only one power source. In other embodiments resources 130 may include no power source and nanogrid 120 may be powered solely by electrical power grid 125. It shall be appreciated that some electrical resources, such as batteries or other power storage elements, may operate as sources under operating certain conditions (e.g., battery discharge) and as loads under other operating conditions (e.g., battery charge).

In the illustrated embodiment resources 130 are located within building 105. In other embodiments one or more of resources 130 may be located outside building 105, typically in contact with or in close proximity to building 105. A few examples of such resources include portions of solar power systems, portions of wind power systems, exterior lighting systems, and swimming pool or hot tub pumps and heaters, to name a few examples. Additionally, while nanogrid system 100 is illustrated in connection with building 105, other embodiments contemplate nanogrid systems provided in connection with other types of localized physical facilities such as arenas, concert venues, monuments and stadiums to name a few examples.

Nanogrid system 100 includes an electronic control system 103 which comprises a communication network 170, a nanogrid controller 110, and controllers associated with each of the resources 130. Network 170 may be an Ethernet, local area network (LAN), controller area network (CAN) or other types of networks operable to provide communication among the components of electronic control system 103.

The controllers associated with each of the resources 130 include resource controllers 142a, 142n, 144a, 144n which are respectively associated with electrical loads 132a, 132n and electrical sources 134a, 134n. Resource controllers 142a, 142n, 144a, 144n are typically structured as microprocessor-based or microcontroller-based controllers with associated non-transitory memory media and communication components and interfaces allowing transmission and receipt of communication over network 170 and may also include a variety of alternate and/or additional components and features as would occur to one of skill in the art with the benefit of the present disclosure. For example, in certain embodiments, one or more resource controllers may comprise multiple control devices, operating in conjunction with one another. Furthermore, in some embodiments one or more of resource controllers 142a, 142n, 144a, 144n may include a user interface comprising one or more user input devices (e.g., a keyboard, mouse, touchscreen, microphone or other input device) and one or more output display devices.

Nanogrid controller 110 is typically structured a microprocessor-based or microcontroller-based computer system with associated non-transitory memory media and communication components and interfaces allowing transmission and receipt of communication over network 170 and may also include a variety of alternate and/or additional components and features as would occur to one of skill in the art with the benefit of the present disclosure. For example, in certain embodiments, nanogrid controller 110 may comprise multiple computers operating in conjunction with one another such as a server cluster.

In the illustrated embodiment nanogrid controller 110 is provided within building 105. In other embodiments, nanogrid controller may be provided at a location remote from building 105, for example, in a separate structure or facility in close proximity to building 105 or in a more remote location such as a cloud based datacenter or server cluster in which case additional networks operatively coupled with network 170 may be utilized in providing communication between nanogrid controller 110 and the other components of electronic control system 103. Such additional networks may include, for example, various combination of one or more wide area networks (WAN), cellular networks, private internet-protocol (IP) networks, the public internet and other types of networks. Furthermore, in some embodiments nanogrid controller 110 may include a user interface comprising one or more user input devices (e.g., a keyboard, mouse, touchscreen, microphone or other input device) and one or more output display devices.

Figure 2:
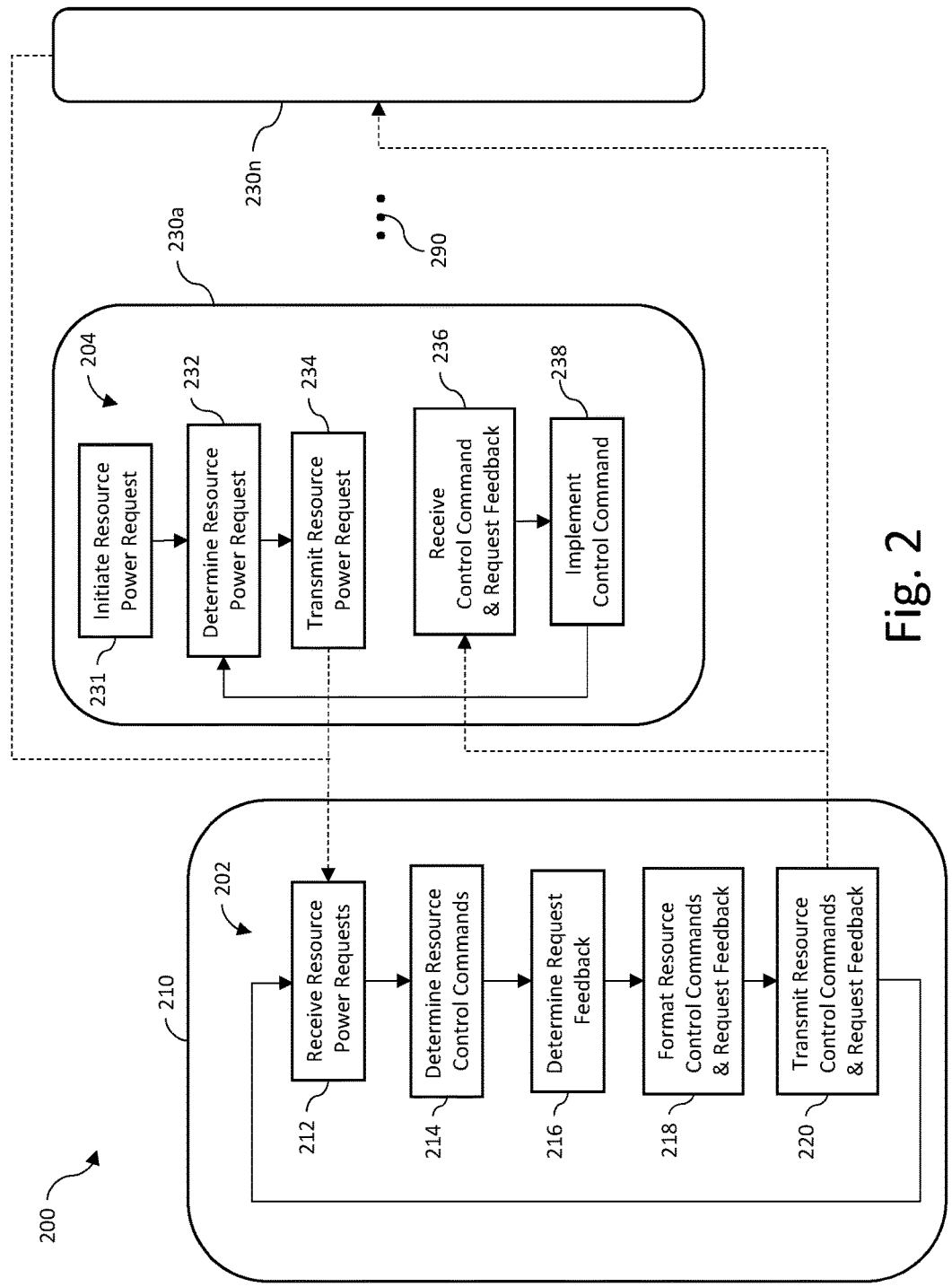
FIG. 2 is a schematic diagram illustrating certain aspects of exemplary nanogrid controls.

With reference to FIG. 2, there are illustrated exemplary nanogrid controls 200 which may be implemented by an electronic control system for a nanogrid, such as electronic control system 103 of nanogrid system 100. Nanogrid controls 200 includes a number of control components 210, 230a, 230n and may include additional control components which are substantially similar to control components 230a, 230n as indicated by ellipsis 290. Control component 210 may be implemented in a nanogrid controller such as nanogrid controller 110. Control components 230a, 230n and additional similar control components may be implemented in respective resource controllers such as resource controllers 142a, 142n, 144a, 144n which are respectively associated with electrical loads 132a, 132n and electrical sources 134a, 134n.

Control component 210 is configured to perform control process 202 which includes a plurality of operations. Block 212 receives power bids from a plurality of resource controllers such as the resource controllers associated with resources 130. Each of the power bids includes a power value and a bid value. The energy value indicates a magnitude of energy or power that a given resource controller is requesting or offering to provide. In certain embodiments, a request for power or energy is indicated by a positive value and an offer to provide power or energy is indicated by a negative value or vice versa, however, other conventions for distinguishing requests and offers may also be utilized, such as the use of separate variables for requests and offers. In some embodiments, the energy value may be specified in terms of units of energy, e.g., kilowatt hours (kWh). In some embodiments, the energy value may be specified in terms of units of power, e.g., kilowatts (kW) and units of time may be associated with the power bid using a standardized time reference or duration reference parameter or assumption. In some embodiments the energy value may be expressed in terms of other units of energy or power, or in units which can be mapped, translated or scaled to units of energy or power.

The bid value indicates a degree of importance or prioritization of the power bid determined by the resource controller which generated the power bid. The bid value may be expressed in terms of a variety of units that provide commonality among all received power bids, for example, the bid values may be expressed in units that are the same for all power bids from all resource controllers or in units that can be converted to common units by control component 210. In certain embodiments the bid value may be configured in terms of currency or monetary units which may, in turn, facilitate the determination of the bid value by each resource controller based upon respective optimizations in terms of the currency or monetary units. The choice of currency or monetary units may be convenient for implementation of optimization controls it the resource controllers. Nevertheless, it shall be appreciated that a variety of common units, including dimensionless numeric values may be utilized provided that they provide the above-indicated commonality among bid values.

From block 212, control process 202 proceeds to block 214 which performs one or more operations effective to evaluate the received power bids and to determine resource control commands for the resource controllers from which power bids have been received. The resource control command may be configured to control resources such as resources 130 in a number of manners including shedding loads, restoring loads, turning a resource on or off, charging or discharging an energy storage resource, starting, stopping or changing the output or operation of a power generation resource, operating a renewable power generation resource at a maximum power point or curtailed mode, and utilizing energy provided from a larger grid when in grid-connected mode. Such control actions can be generally categorized in terms of controlling power supply which may be positive (e.g., generator operation or energy storage discharging), zero (load shedding or load resource turn off) or negative (e.g., energy storage charging, load restoration, load resource turn on). Such control actions can also be generally categorized in terms of controlling power demand which may be negative (e.g., generator operation or energy storage discharging), zero (load shedding or load resource turn off) or positive (e.g., energy storage charging, load restoration, load resource turn on).

Each of the resource control commands is determined in response to an evaluation by block 214 whether and/or to what degree the power bid received from a resource will be satisfied. This determination may be structured to consider the availability and cost of power from a utility grid over a look-ahead operating horizon, the availability and cost of power from one or more electrical sources among resources 130 over the operating horizon, the energy values and bid values of each power bid received from a resource controller associated with one of resources 130 over the operating horizon, and one or more optimization criteria. In certain embodiments, the optimization criteria may include criteria to minimize energy of power cost. In certain embodiments the minimization of energy or power cost may be bounded by a threshold which provides a baseline minimal level of nanogrid operation.

Block 214 may be configured to perform a variety of operations to determine the resource control commands appropriate to minimize system energy cost while also providing reliable nanogrid operation. In order to facilitate a comparison of different sets of resource control commands, each control action may be assigned a score that is scaled such that it can be compared against the score of all other actions. This score may be generated based on environmental, operational and equipment status information associated with each load. For example, the score for an HVAC load may be based on occupancy of the zone, solar radiation received by the zone, outdoor temperature, heat produced by equipment in the zone, and insulation quality of the zone, to name several examples. As a further example, the score for an energy storage unit might be influenced by state of charge, how frequently the unit has been charged or discharged in the recent past, and measurements indicating the health of the unit.

A number of techniques may be utilized to perform a comparison of scores for different resource control commands. Certain embodiments may utilize a neural network model in which each resource control command may be modeled as a logical axon with several logical dendrites representing environmental and equipment data associated with a given resource, each of which provide a weighted signal to the axon. These signals are added together at the axon, and if they exceed a threshold the action becomes viable. Other embodiments may implement a voting or polling technique in which the environmental and equipment data provides a vote from each measurement, and the action that is selected is the one that receives the most votes. Further embodiments may assign a score to each input to a given resource control command, and the selected actions have the highest score.

In a preferred embodiment, each resource control command has a price associated with it along with an energy (kWh) rating that that is provided by taking the action. This produces a price per kWh. This price is responsive to environmental and equipment measurements, with changes in each measurement adding to or subtracting from the price as appropriate. In the present disclosure, the process of making a decision about which action to take is based on receiving an offer of a certain number of kWh at a given price per kWh. The market also receives bids for service from the loads, asking for a certain number of kWh and indicating what price each load is willing to pay for that service. The market then matches bids and offers until all bids for service have been fulfilled or there are no more offers for service which meet the desired price range for the bids. Regardless of the comparison or evaluation technique or techniques which are utilized, changing environmental and equipment status conditions may be updated and the updated values taken into account.

From block 214 control process 202 proceeds to block 216 which preforms one or more operations effective to evaluate the power bids and the resource control commands to determine a power bid feedback value, indicating one or more values at which the power bids received from the resource controllers associated with resources 130 were accepted, either in whole or in part, or rejected. Further details of several exemplary evaluations which may be performed by control block 216 are further described below in connection with FIG. 3 and FIGS. 4A and 4B.

From block 216 control process 202 proceeds to block 218 which formats the resource control commands determined by block 214 and the request feedback determined by block 216 for transmission. A number of formatting conventions may be utilized. In certain embodiments the resource control commands may be formatted for separate transmission addressed to individual corresponding resource controllers. In certain embodiments the resource control commands may be addressed for transmission to all resource controllers and further specify resource controllers corresponding to each resource control command. From block 218 control process 202 proceeds to block 220 which transmits formatted control commands determined and request feedback. It shall be appreciated that a number of transmission protocols may be utilized.

With continuing reference to FIG. 2, control component 230a is configured to perform control process 204 which includes a plurality of control operations. Control component 230n and additional control components associated with resource controllers of other resources such as resources 130 may also be configured to implement control processes similar to control process 204. Block 231 initiates a resource power request based on one or more initiation criteria. In various embodiments initiation of a resource power request may be triggered based on a predetermined timing, receipt of a control signal from another control component such as control component 210, or combinations of these and other initiation criteria.

From block 231 process 204 proceeds to block 232 which generates a power bid including an energy value and a bid value. Block 232 may utilize a variety of techniques to generate a power bid. In certain embodiments, block 232 may utilize an energy or power cost curve or table to determine whether and how much energy to request or offer to supply. In certain forms block 232 may utilize a number of inputs, including a power bid feedback value, a current energy or power demand value, a current energy or power supply value, a predicted energy or power demand value, a predicted energy or power supply, and one or more values indicating environmental and operational conditions of the resource. Such indications may account for current and future demand, supply and environmental and operational conditions over a look-ahead horizon of operation. From block 232 process 204 proceeds to block 234 which transmits the power bid to control component 210 where the power bid is received by block 212.

Block 236 receive a control command and a power bid feedback value from block 220. In the illustrated embodiment, process 204 proceeds from block 236 to block 238 which implements the control command and then returns to block 232 which may utilize the power bid feedback in determining a resource power request thereby implementing a feedback loop in which each resource can reevaluate the bid values which it generates based on the power bid feedback. In certain embodiments, the operations of generating and transmitting power bids and in response generating and transmitting resource control commands and power bid feedback may repeat multiple times before the resource control commands are implemented by the resource controllers. The number of iterations may be controlled based upon a counter, a timer, or convergence criterion which indicates implementation after a sufficient number of iterations have occurred to ensure an appropriate optimization has occurred.

With reference to FIG. 3 there is illustrated a table 300 which depicts the values of certain parameters received by or determined by a control component such as control components 210 as well as operations that have been performed to match electrical loads and electrical sources of a nanogrid. In the example of table 300, each energy value is expressed in units of kilowatt hours (kWh) and each bid value is expressed in terms of dollars per kilowatt hour ($/kWh). It shall be appreciated that no actual transfer of currency or money occurs in connection with intra-nanogrid control operations which utilize a fictive market construct as a control technique, e.g., the battery does not actually purchase energy from the PV energy source. In contrast, an actual transfer of currency or money typically does occur in connection with transfer of energy from the grid.

As indicated in table 300, unlimited grid power is available at a cost of $0.12/kWh, energy sources with an offer price higher than the grid price have been eliminated from consideration for matching with energy loads as indicated by the crossed out cells of table 300. The HVAC, computer equipment, lighting and refrigerator loads each have a bid price greater than the PV energy source offer price and greater than the grid power offer price and have therefore been designated to receive power from the PV energy source and the grid. The grid power offer price is greater than the bid price to charge the energy storage unit so the energy storage unit is not designated to receive power from the grid. Furthermore, there is not enough energy available from the PV energy source to charge the energy storage unit, so the energy storage unit is not designated to receive power from the PV energy storage unit and is not charged. Since neither charging nor discharging designations have been made for the energy storage unit, it may be commanded to turn off or enter a sleep mode. In aggregate, then, the energy from the PV source is provided first by the remaining loads and then the remaining 9.3 kWh is provided by the grid.

In the example of table 300, the fact that a load had not been serviced is communicated back to the energy sources. This information can be used as an input to change their price point along with the environmental and equipment measurements. The energy storage will also take the information that there was not enough energy at their bid price to be able to purchase service and use that to consider raising its bid.

Changes in the scenario described in connection with table 300 further illustrate how controls such as controls system 200 function using a transactive market approach. If the light dimming price were to be dropped, perhaps because several zones had become unoccupied, and reached a value below $0.05/kWh, then there would exist a total energy offer, between light dimming and PV energy, that the energy storage unit could be charged. The energy storage unit would then purchase energy from these two sources, and the 11 kWh from the remaining loads would all be provided by the grid. Alternatively, if the grid is not available, the remaining resources are capable of providing 12 kWh of energy, with a potential load of 13 kWh. Charging the energy storage requires a price below what is on offer, so it is not considered. The PV energy, as the lowest price source, provides 1.7 kWh, then the energy storage unit discharges 2 kWh. The lights dim, providing 0.3 kWh, and the remaining 7 kWh are provided by the generator.

There are a number of optimization routines to efficiently match energy bids and offers. The objective of the optimization is to maximize the number of loads that are serviced while minimizing the actual cost of energy paid to the utility, which additional constraints such as ensuring that critical loads stay online even at the expense of secondary loads. In the event that a conflict occurs, such as an energy storage unit being asked to both charge and discharge at the same time, then the conflicted resource will evaluate which of the two actions has the greatest value to it. It will then withdraw the bid or offer which has the lower value and the market will recalculate the optimal dispatch. In certain embodiments a resource will not pre-emptively withdraw the lower value action, as the higher value action may be rejected while the lower value action is accepted. This maximizes the chance that the resource achieves some value during the transaction.

With reference to FIGS. 4A and 4B there are illustrated tables 400A and 400B which depict the values of certain parameters received by or determined by a control component such as control components 210 at two different points of time or operating states. For their respective operating states, tables 400A and 400B depict the energy value, bid value and control command corresponding to a plurality of resources as well as the request feedback value. The control commands are determined as a result of the evaluation process, which uses the data in the energy value and bid value columns. In the embodiment of FIGS. 4A and 4B, the energy value is expressed in terms of kilowatt-hours (kWh), the bid value is indicated as a dimensionless integer which is also used in the request feedback value, although a variety of units may be utilized as noted above.

In the operating state of table 400A, the nanogrid associated with the indicated resources is operating in an islanded state where power is not available from a connected grid. The nanogrid includes two resources that are potential energy sources, a photo voltaic solar power (PV) system and a storage battery, and three potential loads which are HVAC zones A, B and C. In the illustrated operating state, a control component such as control component 210 has evaluated the energy values and the bid values to determine a plurality of control commands. Through this evaluation the control component has determined that the storage battery is the only available power source and the total energy available is 0.75 kWh. The control component has also compared the bid value which the power storage battery has provided for supplying power with the bid values which the load resources, HVAC zone A, HVAC zone B and HVAC zone C, have provided for demanding power. Since each of the load resources has a bid value greater than that of the storage battery, there is a potential match for power supply to any source. However, since the total demand of these load resources is greater than the available power, the control component must arbitrate and prioritize among the load resources to allocate the available power.

In the operating state of table 400A, the control component has arbitrated and prioritized among the load resources as follows. HVAC zone A has the highest bid value and its requested energy value (0.50 kWh) can be completely satisfied by the available energy. Accordingly, the control component has determined an on at 100% of requested power command for this load. As HVAC zone B has the next highest bid value and its requested energy value (0.50 kWh) can be only partially satisfied by the remaining available energy (0.25 kWh), the control component has determined an on at 50% of requested power command for this load. In this instance the resource controller associated with HVAC zone B is able to reduce its energy requirement by adjusting its temperature set point. In order to satisfy these load demands, the control component has determined a discharge at 100% of offered power command for the storage battery. As there is no remaining available power, the control component has determined an off command for HVAC zone C. As the PV system has no available power, the control component has determined an off command for this source.

In the operating state of table 400A, the request feedback values are formatted to indicate the power supplied at each demanded level of operation and the total available power. This information is provided to resource controllers associated with the denoted resources as feedback from which they may base future resource power requests. It shall be appreciated that request feedback values may be configured in a variety of other manners.

In the operating state of table 400B, the nanogrid associated with the indicated resources is still operating in an islanded state where power is not available from a connected grid, but is now at a later operating state in which the energy values and bid values have changed. Among the power source resources, the PV system has submitted a power bid indicating an ability to supply 0.1 kWh of energy at a bid value of 3, but the storage battery has been depleted to a state in which it can no longer supply power and is instead requesting 0.25 kWh of energy at a bid value of 2. Among the power load resources, HVAC zone A and HVAC zone B are now both requesting 0.50 kWh of energy at a bid value of 8 and HVAC zone C is now requesting 0.50 kWh of energy at a bid value of 7. The updated energy values and bid values have been determined by the resource controller associated with each load in response to changes in the current or predicted environmental and operational state of each resource as well as the request feedback values.

In the operating state of table 400B, the control component has again evaluated the energy values and the bid values to determine a plurality of control commands. Through this evaluation the control component has determined that the PV system is the only available power source and the total energy available is 1 kWh. The control component has also compared the bid value which the power storage battery has set for supplying power with the bid values at which the load resources, HVAC zone A, HVAC zone B and HVAC zone C, have set for demanding power. Since each of these load resources has a bid value greater than that of the storage battery, there is a potential match for power supply to any of these sources. On the other hand, since the storage battery is requesting power at a bid value lower than the lowest bid value of an available source, this load has been eliminated as candidate for receiving power. Again, since the total demand of these load resources is greater than the available power, the control component must arbitrate and prioritize among the load resources to allocate the available power.

In the operating state of table 400B, the control component has arbitrated and prioritized among the load resources has been resolved as follows. As HVAC zones A and have the highest bid value and their requested energy values (0.50 kWh) can be completely satisfied by the available energy, the control component has determined an on at 100% of requested power command for both loads. As there is no remaining available power, the control component has determined an off command for HVAC zone C. The request feedback values have also been updated to indicate the power supplied at each demanded level of operation and the total available power.

A number of exemplary embodiments shall now be further described. A first exemplary embodiment is a system comprising a plurality of resources operatively coupled with a nanogrid electrical power distribution network, the plurality of resources including one or more power loads; a plurality of resource controllers configured to control operation of respective ones of the plurality of resources; and a nanogrid controller in operative communication with the plurality of resource controllers; wherein the nanogrid controller is configured to: receive power bids from the plurality of resource controllers, the power bids including a power magnitude value and a bid value, evaluate the power bids to determine resource control commands for respective resource controllers and a power bid feedback value, the resource control commands being configured to control shedding or restoration of one or more of the power loads, the power bid feedback value indicating a value at which the power bids were one of accepted and rejected, transmit the resource control command to at least one of the plurality of resource controllers, and transmit the power bid feedback value to the plurality of resource controllers; wherein the plurality of resource controllers are configured to: generate and transmit the power bids to the nanogrid controller, receive the resource control command and in response thereto at least one of shed or restore one or more of the power loads, and receive the power bid feedback value and in response thereto generate an updated power bid and transmit the updated power bid to the nanogrid controller.

In certain forms of the first exemplary embodiment, the nanogrid controller is configured to evaluate the power bids over a look-ahead time horizon and to determine the resource control command effective to provide an optimization over a time span of the look-ahead time horizon. In certain forms, the plurality of resources further include one or more power sources having respective resource controllers, the resource control commands include commands configured to control supply from one or more of the power sources, the power bids include a first set of power bids to consume power associated with the one or more power loads and a second set of power bids to supply power associated with the one or more power sources, and the nanogrid controller is configured to evaluate the first set of power bids and the second set of power bids to determine the resource control commands for the respective resource controllers and the power bid feedback value, the resource control commands being configured control shedding or restoration of one or more of the power loads and to control supply from one or more of the power sources. In certain forms, at least one resource controller associated with one of the power sources is configured to evaluate and resolve conflict between two or more resource control commands by selecting between the two or more resource control commands and in response to the selecting withdrawing at least one power bid. In certain forms, the nanogrid controller is provided in an optimization server. In certain forms, the optimization server is in operative communication with the plurality of resource controllers via a local area network. In certain forms, the one or more power sources comprise at least one of a generator, a battery and a photo-voltaic source.

A second exemplary embodiment is a method of controlling a nanogrid including a plurality of resources including one or more power loads, a plurality of resource controllers configured to control operation of respective ones of the plurality of resources and a nanogrid controller in operative communication with the plurality of resource controllers, the method comprising: receiving with the nanogrid controller power bids generated by the plurality of resource controllers, the power bids being normalized to a common metric; evaluating the power bids with the nanogrid controller to determine a resource control command and a power bid feedback value, the resource control command being executable to at least one of control shedding or restoration of one or more of the power loads, the power bid feedback value indicating a value at which the power bids were one of accepted and rejected; and outputting the resource control command and the power bid feedback value to a communication network.

In certain forms of the second exemplary embodiment, the act of evaluating the power bids with the nanogrid controller to determine a resource control command comprises operating a neural network wherein the resource control command is structured as an axon associated with a plurality of dendrites, the plurality of dendrites representing one or more, environmental or equipment measurements and being structured to provide a weighted input to the axon, the axon being structured to determine a sum of the inputs and compare the sum to a threshold. Certain forms comprise generating the power bids with the plurality of resource controllers; transmitting the power bids from the plurality of resource controllers to the nanogrid controller; receiving the resource control command with one or more of the plurality of resource controllers and in response thereto at least one of shedding or restoring one or more of the power loads; and receiving with the plurality of resource controllers the power bid feedback value and in response thereto generating one or more updated power bids and transmitting the one or more updated power bids to the nanogrid controller. Certain forms comprise operating the nanogrid controller to evaluate the power bids over a look-ahead time horizon and to determine the resource control command effective provide an optimization over a time span of the look-ahead time horizon. Certain forms comprise operating at least one resource controller to resolve conflict between two or more resource control commands by selecting between the two or more resource control commands and in response to the selecting withdrawing at least one power bid. Certain forms comprise controlling a supply power from one or more power sources among the plurality of resources by one or more of charging, discharging, turning on, turning off, changing the output of and changing the power setpoint of one or more power sources. In certain forms, the power bids include a first set of power bids to consume power and a second set of power bids to supply power. In certain forms, the act of evaluating the power bids with the nanogrid controller to determine a resource control command comprises evaluating a magnitude of one of a number of votes, a number of points and a currency value associated with each of the power bids.

A third exemplary embodiment is an apparatus comprising a nanogrid controller configured to operatively communicate with a plurality of resource controller coupled with a respective plurality of resources operatively coupled with a nanogrid electrical power distribution network, the plurality of resources including one or more power loads and one or more power sources; wherein the nanogrid controller is configured to: receive power bids from the plurality of resource controllers, the power bids including a power magnitude value and a bid value, evaluate the power bids to determine resource control commands for respective resource controllers and a power bid feedback value, the resource control command being configured to at least one of control shedding or restoration of one or more of the power loads and control supply from one or more of the power sources, the power bid feedback value indicating a value at which the power bids were one of accepted and rejected, transmit the resource control command to at least one of the plurality of resource controllers, and transmit the power bid feedback value to the plurality of resource controllers.

Certain forms of the third exemplary embodiment comprise the plurality of resource controllers, and each of the plurality of resource controllers configured to: generate and transmit the power bids to the nanogrid controller, receive the resource control command and in response thereto at least one of shed or restore one or more of the power loads and control a supply power from one or more of the power sources, and receive the power bid feedback value and in response thereto generate an updated power bid and transmit the updated power bid to the nanogrid controller. In certain forms, the nanogrid controller is configured to evaluate the power bids over a look-ahead time horizon and to determine the resource control command effective to provide an optimization over a time span of the look-ahead time horizon. In certain forms, the power bids include a first set of power bids to consume power and a second set of power bids to supply power. In certain forms, at least one resource controller associated with one of the power sources is configured to evaluate and resolve conflict between two or more resource control commands by selecting between the two or more resource control commands and in response to the selecting withdrawing at least one power bid.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a plurality of resources operatively coupled with a nanogrid electrical power distribution network, the nanogrid electrical power distribution network including multiple resources of a building or other physical facility which are controllable by a common control system, the plurality of resources including one or more power loads;
a plurality of resource controllers configured to control operation of respective ones of the plurality of resources; and
a nanogrid controller in operative communication with the plurality of resource controllers;

wherein the nanogrid controller is configured to:
receive power bids from the plurality of resource controllers, the power bids including a power magnitude value and a bid value,
evaluate the power bids to determine resource control commands for respective resource controllers and a power bid feedback value, the resource control commands being configured to control shedding or restoration of one or more of the power loads, the power bid feedback value indicating a value at which the power bids were one of accepted and rejected,
transmit the resource control command to at least one of the plurality of resource controllers, and
transmit the power bid feedback value to the plurality of resource controllers;
wherein the plurality of resource controllers are configured to:
generate and transmit the power bids to the nanogrid controller,
receive the resource control command and in response thereto at least one of shed or restore one or more of the power loads, and
receive the power bid feedback value and in response thereto generate an updated power bid and transmit the updated power bid to the nanogrid controller.

2. The nanogrid control system of claim 1 wherein the nanogrid controller is configured to evaluate the power bids over a look-ahead time horizon and to determine the resource control command effective to provide an optimization over a time span of the look-ahead time horizon.

3. The nanogrid control system of claim 2 wherein the plurality of resources further include one or more power sources having respective resource controllers, the resource control commands include commands configured to control supply from one or more of the power sources, the power bids include a first set of power bids to consume power associated with the one or more power loads and a second set of power bids to supply power associated with the one or more power sources, and the nanogrid controller is configured to evaluate the first set of power bids and the second set of power bids to determine the resource control commands for the respective resource controllers and the power bid feedback value, the resource control commands being configured control shedding or restoration of one or more of the power loads and to control supply from one or more of the power sources.

4. The nanogrid control system of claim 3 wherein at least one resource controller associated with one of the power sources is configured to evaluate and resolve conflict between two or more resource control commands by selecting between the two or more resource control commands and in response to the selecting withdrawing at least one power bid.

5. The nanogrid control system of claim 1 wherein the nanogrid controller is provided in an optimization server.

6. The nanogrid control system of claim 5 wherein the optimization server is in operative communication with the plurality of resource controllers via a local area network.

7. The nanogrid control system of claim 3 wherein the one or more power sources comprise at least one of a generator, a battery and a photo-voltaic source.

8. A method of controlling a nanogrid including a plurality of resources of a building or other physical facility, the plurality of resources including one or more power loads, a plurality of resource controllers configured to control operation of respective ones of the plurality of resources and a nanogrid controller in operative communication with the plurality of resource controllers, the method comprising:
receiving with the nanogrid controller power bids generated by the plurality of resource controllers, the power bids being normalized to a common metric;
evaluating the power bids with the nanogrid controller to determine a resource control command and a power bid feedback value, the resource control command being executable to at least one of control shedding or restoration of one or more of the power loads, the power bid feedback value indicating a value at which the power bids were one of accepted and rejected; and
outputting the resource control command and the power bid feedback value to a communication network.

9. The method of claim 8 wherein the act of evaluating the power bids with the nanogrid controller to determine a resource control command comprises operating a neural network wherein the resource control command is structured as an axon associated with a plurality of dendrites, the plurality of dendrites representing one or more, environmental or equipment measurements and being structured to provide a weighted input to the axon, the axon being structured to determine a sum of the inputs and compare the sum to a threshold.

10. The method of claim 8 comprising:
generating the power bids with the plurality of resource controllers;
transmitting the power bids from the plurality of resource controllers to the nanogrid controller;
receiving the resource control command with one or more of the plurality of resource controllers and in response thereto at least one of shedding or restoring one or more of the power loads; and
receiving with the plurality of resource controllers the power bid feedback value and in response thereto generating one or more updated power bids and transmitting the one or more updated power bids to the nanogrid controller.

11. The method of claim 8 comprising:
operating the nanogrid controller to evaluate the power bids over a look-ahead time horizon and to determine the resource control command effective provide an optimization over a time span of the look-ahead time horizon.

12. The method of claim 8 comprising:
operating at least one resource controller to resolve conflict between two or more resource control commands by selecting between the two or more resource control commands and in response to the selecting withdrawing at least one power bid.

13. The method of claim 8 further comprising controlling a supply power from one or more power sources among the plurality of resources by one or more of charging, discharging, turning on, turning off, changing the output of and changing the power setpoint of one or more power sources.

14. The method of claim 8 wherein the power bids include a first set of power bids to consume power and a second set of power bids to supply power.

15. The method of claim 8 wherein the act of evaluating the power bids with the nanogrid controller to determine a resource control command comprises evaluating a magnitude of one of a number of votes, a number of points and a currency value associated with each of the power bids.

16. A apparatus comprising:
a nanogrid controller configured to operatively communicate with a plurality of resource controller coupled with a respective plurality of resources operatively coupled with a nanogrid electrical power distribution network, the plurality of resources including one or more power loads and one or more power sources of a building or other physical facility;

wherein the nanogrid controller is configured to:

receive power bids from the plurality of resource controllers, the power bids including a power magnitude value and a bid value, evaluate the power bids to determine resource control commands for respective resource controllers and a power bid feedback value, the resource control command being configured to at least one of control shedding or restoration of one or more of the power loads and control supply from one or more of the power sources, the power bid feedback value indicating a value at which the power bids were one of accepted and rejected, transmit the resource control command to at least one of the plurality of resource controllers, and transmit the power bid feedback value to the plurality of resource controllers.

17. The apparatus of claim 16 comprising:

the plurality of resource controllers, each of the plurality of resource controllers configured to:

generate and transmit the power bids to the nanogrid controller, receive the resource control command and in response thereto at least one of shed or restore one or more of the power loads and control a supply power from one or more of the power sources, and receive the power bid feedback value and in response thereto generate an updated power bid and transmit the updated power bid to the nanogrid controller.

18. The apparatus of claim 17 wherein the nanogrid controller is configured to evaluate the power bids over a look-ahead time horizon and to determine the resource control command effective to provide an optimization over a time span of the look-ahead time horizon.

19. The nanogrid apparatus of claim 18 wherein the power bids include a first set of power bids to consume power and a second set of power bids to supply power.

20. The apparatus of claim 19 wherein at least one resource controller associated with one of the power sources is configured to evaluate and resolve conflict between two or more resource control commands by selecting between the two or more resource control commands and in response to the selecting withdrawing at least one power bid.

21. The system of claim 1 wherein the nanogrid controller is configured to determine different resource control commands for the respective resource controllers depending upon whether the nanogrid is electrically coupled or decoupled to an electrical power grid by an electronically controllable switching device.

22. The system of claim 1 wherein the plurality of resources controllers comprise one or more electrical source controllers and one or more electrical load controllers, the one or more electrical source controllers are configured to output power bids to supply the power magnitude at the bid value, and the one or more electrical load controllers are configured to output power bids to consume the power magnitude at the bid value.

23. The method of claim 8 wherein the resource control command determined by evaluating the power bids with the nanogrid controller varies depends on whether or not the nanogrid is electrically coupled with an electrical power grid.

24. The method of claim 8 wherein the power bids generated by the plurality of resource controllers include one or more bids to supply electrical power and one or more bids to consume electrical power.

25. The apparatus of claim 16 wherein the nanogrid controller is configured to determine different resource control commands for the respective resource controllers depending upon whether the nanogrid is in an islanded state wherein the nanogrid is decoupled from an electrical power grid.

26. The apparatus of claim 16 wherein the power magnitude values of the power bids received by the nanogrid controller comprise at least one magnitude value to supply electrical power and at least one magnitude value to consume electrical power.

* * * * *